Figure 1:
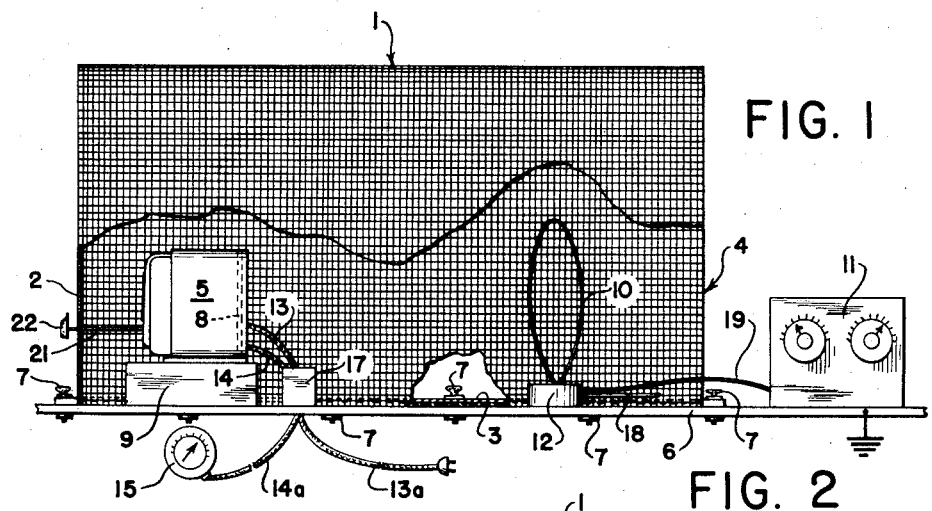

Nov. 17, 1959 J. K. JOHNSON 2,913,577
HIGH-FREQUENCY SCREENING ENCLOSURE
Filed Oct. 18, 1954 2 Sheets-Sheet 1

INVENTOR.
J. Kelly Johnson
BY
Pennie, Edmonds, Morton, Barrows and Taylor.
ATTORNEYS

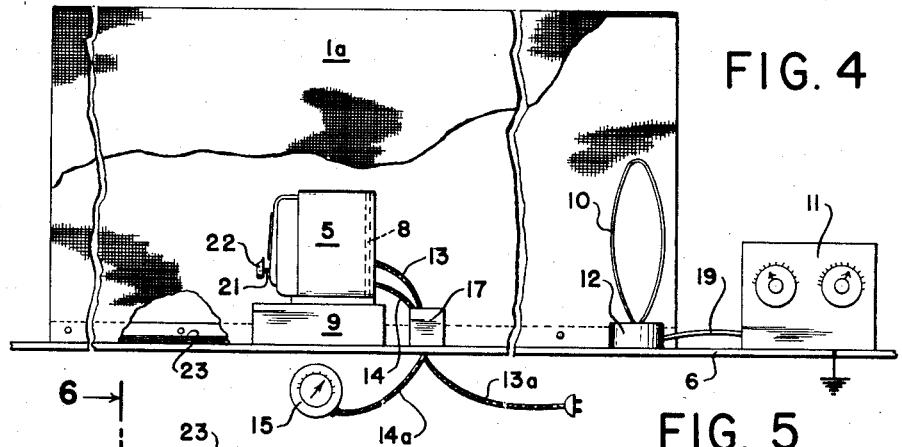
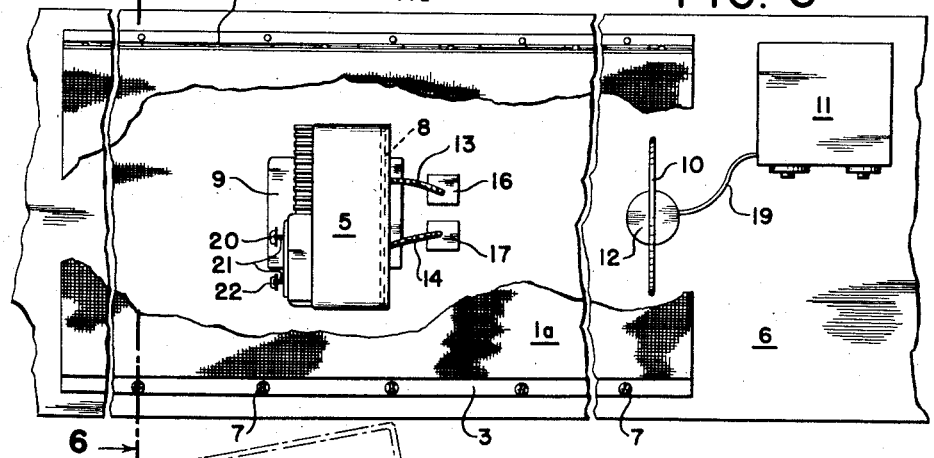
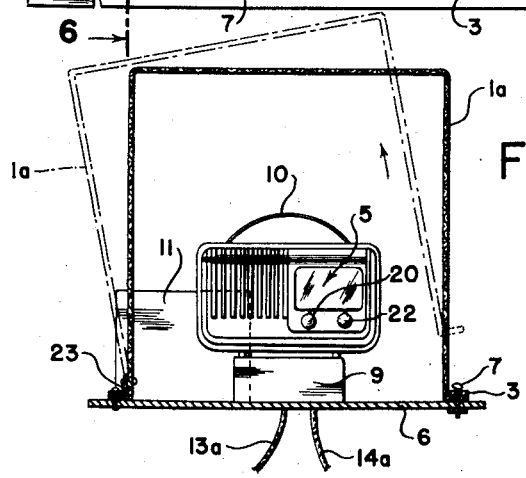

United States Patent Office 2,913,577
Patented Nov. 17, 1959

2,913,577

HIGH-FREQUENCY SCREENING ENCLOSURE

John Kelly Johnson, New Canaan, Conn.

Application October 18, 1954, Serial No. 462,977

14 Claims. (Cl. 250—20)

This invention relates to the testing of electrical apparatus and especially to enclosures for screening high-frequency apparatus, such as radio receivers and the like, from interfering signals during a testing procedure. Such testing procedure in connection with radio receivers commonly involves measurement of sensitivity, selectivity, audio-frequency response, automatic gain control, distortion, output overload characteristics and, in superheterodyne receivers, intermediate frequency and image ratios, as well as other characteristics.

In accordance with the invention the dimensions of the screening enclosure are reduced so much as to be sufficient substantially only to accommodate the apparatus under test together with the artificial antenna of a signal generator or the like, the proportions being such that interfering signals are greatly attenuated without undesired attenuation of the test signals.

The present practice in testing radio receivers and similar apparatus is to erect a large enclosure or structure covered either with a single or two separate complete layers of metallic shielding, usually connected together and connected to earth at a single point. This shielding may be either of solid metal sheet or woven wire metal screen. Within the enclosure are located one or more work benches upon which are placed the receiver to be tested and the test generators and necessary meters. Such booths or screen rooms must be large enough to accommodate the person conducting the tests, and they are not only expensive, but are usually inconvenient and uncomfortable to work in because they are customarily made no larger than is necessary. One reason for making them even larger than would be physically necessary to accommodate the above-mentioned items is that it has been considered in the art that a test loop or radiator for inducing test signals into receivers with loop atennas should be removed from the walls of the screen enclosure by several times the distance between the test loop and the receiver loop. Such spacing has been considered necessary primarily to prevent the inductive field configuration between the transmitting and receiving loops from being substantially altered by the fields of the currents induced in the conductive walls of the enclosure, and in order that the strength of the field at the location of the receiving loop may be determined by calculation as though the loop were isolated in free space.

I have found that it is not necessary for either reason to provide such a large screening enclosure and that entirely satisfactory testing may be achieved with a very small screening enclosure, if this is constructed and employed according to my invention.

Figure 2:
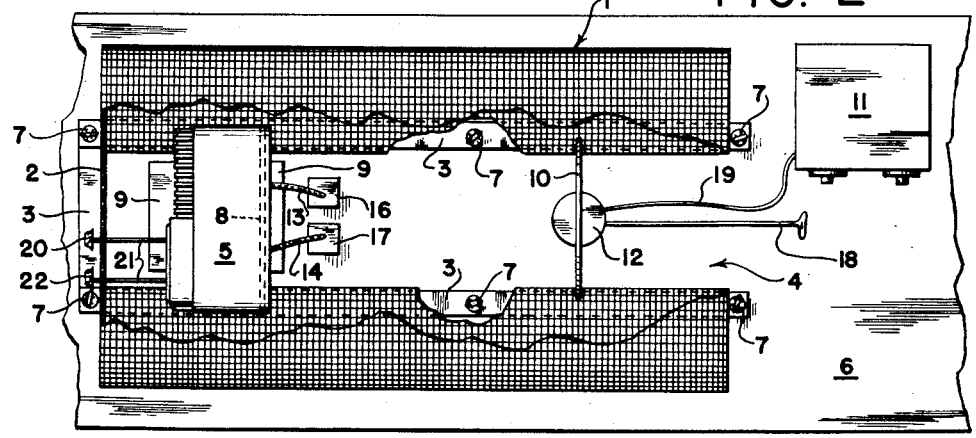
Figure 3:
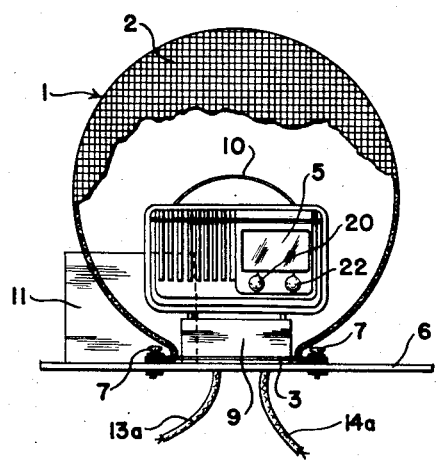

An understanding of the invention may be had from the following description considered in connection with the accompanying drawings in which Fig. 1 is a side elevational view, Fig. 2 is a plan view, and Fig. 3 is an end elevational view, all partly cut away, of a preferred form of the invention in which one end of the enclosure is closed;

Fig. 4 is a side elevational view of a modified form of the invention in which both ends of the enclosure are open, Fig. 5 is a plan view thereof, and Fig. 6 is a cross-sectional view taken along line 6—6 of Fig. 5.

The form of enclosure illustrated in Figs. 1–3 consists of a nearly cylindrical cage 1 which, for testing small radio receivers of the table and portable types for example, need be only approximately 20 inches across and of material commercially known as hardware cloth having ¼ inch to ½ inch apertures between the wires of which it is woven. This type of screen is galvanized after weaving, thus bonding all wire intersections both mechanically and electrically, to produce, for all but the centimeter and shorter wavelengths, substantially the effect of a continuous metal sheet through which very little radio-frequency energy can penetrate. Solid metal could also be used but would be opaque, whereas it is very convenient to be able to see through the enclosure and also to be able to pass controls and connecting wires through the meshes, and the shielding effect of the screening is adequate, except for ultra-high frequency work for which the solid metal is preferable.

In the form illustrated, one end of the cage 1 is closed with a panel 2 of the same material soldered around its periphery to comprise a good electrical and mechanical bond. Instead of completing the lower side of the cage, a portion along the bottom is left open and a metal frame in the shape of a rectangular U (as viewed from above) is electrically and mechanically bonded around the open bottom of the cage. Since the remaining end 4 of the cage is left open, this structure can be readily slid over a radio receiver 5 under test, or withdrawn without disturbing the test set up. If used with a test bench having a metal top 6 the metal frame of the enclosure is supported on and held in firm contact with the metal bench top by any convenient means, such as clamps 7, to make good electrical contact therewith. The conductive area of the metal bench top 6 which is within the frame will thus complete the periphery of the enclosure, leaving only the remaining end open.

In order to raise the receiver to a suitable height within the cage 1, and preferably so that the receiving loop antenna 8 is disposed approximately in the central portion (vertically) of the cage, it is frequently necessary to support the receiver on a pedestal 9. Similarly the transmitting loop 10 of the signal generator 11 is also preferably elevated on a pedestal 12 so that the electrical center of the loop is substantially on the horizontal axis which passes through the electrical center of the receiving loop 8. In Figs. 1 and 4 the loop 10 is for clarity drawn in perspective. Actually it is parallel to loop 8 as shown in Figs. 2 and 5. The signal generator is shown in generalized representation only because it may take any of various forms depending on the nature of the measurements to be made as is well understood in the art. Shielded connecting wires 13, 13a are connected to the receiver before the enclosure is placed over it so that operating power can be conveniently connected to the receiver; and a second set of shielded connecting wires 14, 14a are provided to connect the output from the receiver to a suitable indicating meter 15. Grounded metal casings 16 and 17 enclose suitable filter elements connected in the leads 13 and 14 to prevent interfering signals from entering the receiver through the leads which extend from the inside to the outside of the enclosure. A long handle 18 of insulating material is secured to the pedestal 12 so that the spacing and angular adjustment of loop 10 with respect to receiver loop 8 can be changed from outside the enclosure. The shielded connecting leads 19 from the signal generator 11 to loop 10 are, of course, long enough to permit the mentioned adjustments.

In testing a radio receiver it is usually necessary to adjust the tuning circuits over a range of frequency, (Throughout this specification, and in the claims, the term "radio receiver" applies to such apparatus whether or not it is enclosed in a cabinet or the like.) For this purpose I provide an insulating shaft 21 of suitable length, carrying an adjustable knob 20. This shaft extends through the end 2 of the screening structure and is affixed to the tuning shaft of the radio receiver 5. Insulating shaft 21 may, in the presently assumed case, be approximately 8 to 10 inches long and can be secured to the tuning shaft of the receiver before the screening enclosure is slid into place. The knob 20 may thereafter be secured to the end of it. An additional knob 22 on a similar insulating shaft is shown in the drawing to represent an additional adjusting means, as for example, the tone control for the radio receiver. Other similar adjusting means are occasionally required, as, for example, in manipulating frequency-band switches and volume or gain controls.

The embodiment illustrated in Figs. 4, 5 and 6 is in essential respects the same as that shown in the previous figures. The principal differences comprise the cross-sectional shape of the screen enclosure 1a, the manner of its attachment to the top of the test bench, and the fact that both ends of the enclosure are open. It will be observed that the cross-sectional shape of this cage is substantially square. The enclosure 1a is secured to the metallic top 6 of the test bench by a hinge 23, which preferably is continuous along the length of the enclosure, and by suitable clamps 7, as before. Thus instead of sliding the enclosure over the apparatus to be shielded thereby as in the previous case, it is closed over it as by the cover of a box. Such an arrangement is more especially useful in connection with an enclosure which is open at both ends, as will be referred to below, but it may also have one end closed. In this case the insulating shafts to which adjusting knobs 20 and 22 are attached could be inserted through the mesh of the end screen and then pushed into connection with the corresponding shafts of the radio receiver, after the screening enclosure is in place. Alternatively, slots in the end 2 opening on the bottom of the enclosure may be disposed to fit the protruding control shafts. If the signal leakage through such slots is appreciable, the receiving loop must be spaced farther from this end. The loop would have to be spaced still farther from this end if it were completely open.

The operation of the screening enclosure in accordance with my invention depends upon the facts that the enclosure itself forms a tube of conductive material and that extraneous or interfering signals can enter the structure substantially only through an open end. Then, if the transmitting and receiving antennas 10 and 8 within the structure are of directional or polarized type and are arranged, as is preferably the case, so that the principal axis of the desired transmitted radio waves is coincident with the longitudinal axis of the enclosure or is close and parallel to it, the resulting signal-to-interference (viz., desired signal to interfering signal) ratio will be high because any interfering signal entering through the sides of the cylinder will be greatly attenuated at the receiving antenna. At the same time the signal from the transmitting antenna 10 intercepted by the receiving antenna 8 will be of considerably greater amplitude than any extraneous signal entering through the open end. This very desirable effect is due to the proportions of the enclosure and the spacing between the antennas as well as the spacing between the receiving antenna and the ends of the structure. The attenuation of signals increases with the distance between the source and the pickup or receiving antenna at a rate which may be expressed in decibels per effective diameter along the major axis of the cylinder. With antennas of the forms herein described the rule applies practically to the point where the adjacent edges of the antennas touch.

Interfering signals which enter via the end are similarly attenuated as they pass down the tubular cage, and the rate of attenuation varies from 33.3 decibels per radius to 16 decibels per radius, as is explained by Harnett and Case in an article entitled "Multirange Receivers," Proceedings Institute of Radio Engineers, June 1935, pages 578–593, especially pages 580–585. The mentioned value of 33.3 decibels applies to coaxial coils in a circular conductive-walled tube. For coaxial coils in a square tubular cage such as shown in Figs. 4–6, the attenuation is 27.3 decibels per equivalent radius.

If the transmitting and receiving loops are coplanar (whether they be wound in flat form or in cylindrical form) the attenuation is 16 decibels per radius for a circular tube and 13.54 decibels per radius for a square tube. The attenuation for a tube having intermediate form, such as an oval, would lie between these figures.

In the Harnett and Case paper the rule is applied to piston attenuators for adjusting the attenuation of high-frequency waves, and thus adjusting the transfer of wave energy between a radiating element and an absorbing element. By experiment and calculation I have found that the principle there explained can be applied with good effect to a screening enclosure of the type and for the purpose herein described wherein the attenuation rule is taken advantage of by greatly attenuating undesired or extraneous interfering signals entering via an open end of the screening enclosure. Of course, the rule also applies to the desired signals transmitted from the radiating antenna to the receiving antenna within the structure, but this is of little consequence because ample signal energy can nevertheless be transferred between these antenna elements merely by placing them sufficiently close together.

Although the mentioned paper describes an instrument employing a copper attenuating tube two inches in diameter, I have found that the rule also applies sufficiently closely to tubes of other conducting materials having a diameter sufficiently large to accommodate an entire radio receiver. For example, a cylinder 20 inches in diameter (which is large enough to accommodate most of the types of small table model radio broadcast receivers) should have a length of approximately 36 inches to attenuate by 100 decibels a radio-frequency field existing at its open end. This assumes that the receiver loop is placed six inches from the closed end of the cylinder with its axis substantially coincident with the axis of the cylinder. Under the same conditions except that the axis of the receiver loop is at right angles to that of the cylinder, the attenuation would be 48 decibels. Since the attenuation directly through the screening material of the type above referred to is approximately 60 decibels there is no advantage in making the attenuation from the open end greater than this amount. Also, if the receiver loop is located approximately 10 inches from the closed end of the 20-inch cylinder, entirely satisfactory results can be achieved in connection with most routine measurements.

Although most radio receivers incorporate inductive antennas, occasionally radio equipment employs an antenna of the capacitive type. The required relations for this type of antenna are also given in the Harnett and Case paper, beginning at page 580 where it is mentioned specifically that in that case the attenuation is 20.9 decibels per radius for a circular cylinder tube, and 19.3 decibels for a square tube.

The advantage of attenuating interfering signals by means of this invention may also be had by connecting the signal generator to the "antenna" connection on the radio receiver within the enclosure through a simple condenser, or a standard dummy antenna. This assumes that the receiver is provided with a coil antenna which would pick up interfering signals unless shielded by the enclosure of this invention, although in this case the desired signals are fed directly to the input circuit instead of by induction or radiation through space to the receiver antenna. Ocassionally portable radio receivers are designed to operate with an antenna which is connected to but physically removable from the receiver proper. If the receiver is itself sufficiently shielded, such antenna alone may be inserted in my shielding enclosure and the receiver positioned outside it for convenience in manipulating its controls.

The transmitting or radiating loop 10 may, for instance, be located within the cylinnder above described and spaced from the receiver loop 8 approximately 13.5 inches. This spacing produces in the receiving loop 10 substantially the same signal within the 20-inch diameter screening enclosure as the standard spacing for such test measurements provides in the absence of such enclosure. The "standard" spacing just mentioned is a reference to the specifications for testing radio receivers generally employed in the art, as set forth in the Institute of Radio Engineers' "Standards of Radio Receivers," 1938, especially pages 23–26.

It is therefore seen that by the application of the principles of the attenuators discussed in the Harnett and Case article above referred to, this invention permits a great decrease in the relatively wide separation heretofore required between the receiving and transmitting loops, so that not only is the entire screening enclosure much smaller than was formerly believed possible, but the very currents induced in the enclosure walls, which were formerly thought to be harmful, are used to permit the enclosure size to be made even smaller.

The diameter of the shielding cage of my invention may be as small as is consistent with ease of insertion of the receiver and test loop, provided this is not much less than about three times the largest diameter of the pickup loop of the receiver under test. With cages appreciably smaller in diameter than this ratio, the constants of the receiver loop, such as inductance and resistance, are altered by the presence of the cage material, and the test results tend to become less accurate.

The spacing of the receiver loop, or antenna, from the closed end of the cage is not critical, but there should be enough spacing to prevent the test signal reflected from the closed end from greatly reducing the effective signal amplitude at the receiver loop. In the mentioned example, this signal, in proceeding from the position of the loop to the closed end and back to the loop by reflection, would be attenuated more than 60 decibels in the 20-inch travel so that it would have no preceptible effect on the signal induced in the receiver loop from the test loop.

In the case of the open-end cage and loops coaxial therewith, a good general rule is that the spacing between any open end and the receiving loop be substantially equal to at least the diameter, or the effective transverse dimension, of the cage. A longer cage will of course provide more attenuation. In the case of coplanar loops which lie substantially on the longitudinal axis of the cage, the spacing between any open end of the cage and the receiving loop should be substantially equal to at least twice the smallest transverse dimension of the cage. These spacings will provide an attenuation of approximately 67 and 64 decibels respectively, which should be adequate under all ordinary conditions.

Most small radio receivers incorporate loop antennas of approximately rectangular or oval form. I have found that the screening enclosure of this invention will have no substantial effect upon the losses or the tuning of the receiving loop or antenna in such receivers if the wall of the enclosure is separated from the loop by a distance at least equal to the diameter of the receiving antenna loop. This consideration is the principal one in determining the cross-sectional dimensions of the shielding enclosure, although they obviously must be large enough to enclose at least the antenna, and usually the entire radio receiver.

If both ends are left open, the cage must be lengthened and the receiving loop located approximately in the longitudinal center of the cage, as illustrated in Figs. 4–6. For example, on the basis of the above-mentioned 20-inch screening enclosure, the cage would be approximately 52 inches long, the receiving loop located 26 inches from each end and the radiating loop spaced the same distance as before from the receiving loop, viz., approximately 13.5 inches. Although the length is approximately doubled in the case of a cage having both ends open, certain advantages are to be obtained therefrom, among which are that the effect of the wave reflection from a closed end is avoided, ready access from either end is provided to the apparatus and components enclosed in the cage, and application of the invention to certain testing conditions, such as obtain on a moving production-line belt, is facilitated.

The material of which the enclosure is constructed, and the dimensions thereof, largely determine the lower and upper frequencies for which it operates as described herein. For frequencies so low that the screen or sheet material of which the enclosure is constructed is penetrated by external interfering signals the effectiveness of its shielding is lost, and for frequencies so high that the open end aperture has a dimension greater than ⅛ to ¼ wavelength of such interfering frequencies, the attenuation along the axis of the enclosure rapidly decreases with increase of frequency until, for much higher frequencies, it becomes effectively a wave guide with very little attenuation per unit length. The screen enclosure of this invention operates according to the principle of the "wave guide below cut-off" form of microwave attenuator, which is but another name for the device described in the Case and Harnett paper above referred to. For example, the cage, having a 20-inch diameter as mentioned for illustrative purposes, would cease to provide effective attenuation to signals entering the open end at frequencies above 300 megacycles per second, and the screen mesh on the side walls would tend to become relatively penetrable by magnetic fields of frequencies below 30 kc. per second.

Those skilled in the art will easily adapt the invention to specific production-line conditions, and these may permit, for example, connections to the radio receiver by long cords which travel to the testing location within the loop and thence to the far end of the cage where they are detached; or stationary trolley wires can be arranged to run through the cage with clips or sliding contacts on the wires secured to leads connected to the receiving set. In production line testing, sensitivity is usually the characteristic to be measured. The indicating meter or meters can be located inside the cage and read from the outside by observation through the screen material, or the meters can be located on the outside of the cage. The transmitting loop may comprise an edge-wound coil positioned within the cage and formed with an open center through which the receiver passes. When the receiver loop arrives at a predetemined marked position with respect to the transmitting loop the necessary reading may be taken.

While the foregoing specification has been particularly concerned with the description of shielding test cages which have one or both ends open, it should be understood that the advantages secured by the invention are not limited to this open-end construction alone, although in most cases it would be preferred and used. The term "open," referring to the ends of the enclosure, relates to the electrical nature of the cage ends. For purposes of safety or convenience these ends might be mechanically closed by members not having electrical shielding properties, or by members whose shielding properties are substantially less effective than those of the side walls of the cage, without departing from the spirit of the invention. This follows from the fact that residual signals entering through these ends will be greatly attenuated by the tubular structure of the cage if it is proportioned as previously described.

It is well known that maximum signal voltage is induced in the pickup loop, viz., antenna, when the plane of the loop is parallel to the direction of propagation of the intercepted electromagnetic waves. Hence when the pickup loop is disposed parallel to the axis of the tubular cage it will be most sensitive to such waves entering through the ends of the cage. In such cases the advantages of the invention are secured even when the ends of the cage are electromagnetically screened to some degree because they are then inevitably open to some degree.

It will be appreciated by those skilled in the art that, although the above specification describes this invention more especially in connection with the testing of small radio receivers, the invention as defined in the subjoined claims has many other applications in the radio testing and measuring art where and cheap screening enclosures for the instrument being tested would be desirable.

I claim:

1. High-frequency testing apparatus for use in testing radio receivers of the type fitted with an inductive coil type antenna, comprising a metallic screening structure of overall dimensions suitable for use on a test bench or the like, of closed cylindrical form and having a minimum transverse dimension such that, when said receiver is enclosed in said structure, the spacing between said antenna and the wall of said cylinder equals at least the largest dimension of said antenna when the plane of said antenna is disposed at right angles to the axis of the cylinder, a metallic end member closing one end of said cylinder and electrically connected thereto around the periphery thereof, said cylinder having one end open to the entrance of interfering high-frequency signals and being of length great enough to attenuate a high-frequency signal entering such open end thereof as measured at the location of said antenna therein, to an amplitude appreciably less than that of the same signal intercepted by said antenna after passing through said screening structure in the plane of said antenna, inductive-antenna means in said cylinder, conductor means connected to said antenna means and adapted to connect an external signal generator thereto, and insulator means securable to said antenna means extending through said open and adapted to be manually moved from outside said cylinder to adjust the position of said antenna means within said cylinder.

2. High-frequency testing apparatus for use in testing radio receivers of the type fitted with an inductive coil type antenna, comprising a tubular metallic screening structure of overall dimensions suitable for use on a test bench or the like, of closed cylindrical form and having a minimum transverse dimension such that, when said receiver is enclosed in said structure, the spacing between said antenna and the nearest wall of said cylinder equals at least the largest dimension of said antenna when the plane of said antenna is disposed at right angles to the axis of the cylinder, said cylinder having a maximum transverse dimension not substantially greater than one-quarter of the wavelength of the highest of the test frequencies, a metallic end member closing one end of said cylinder and electrically connected thereto around the periphery thereof, said cylinder having one end open to the entrance of interfering high-frequency signals and being of length great enough to attenuate a high-frequency signal entering such open end thereof as measured at the location of said antenna therein, to an amplitude appreciably less than that of the same signal received by said antenna after passing through the walls of said screening structure, inductive-antenna transmitting means, in said cylinder proportioned to be insertable and removable through the open end thereof, and conductor means connected to said antenna transmitting means and adapted to connect an external signal generator thereto.

3. High-frequency testing apparatus adapted for use in testing a radio receiver of the type provided with an inductive antenna, including a metallic screening structure of overall dimensions suitable for use on a test bench or the like, of closed approximately cylindrical form and having a minimum transverse dimension such that, when said receiver is enclosed in said structure, the spacing between said antenna and the nearest wall of said cylinder equals at least the largest dimension of said antenna in a plane at right angles to the axis of the cylinder, said cylinder having at least one open end and having a maximum transverse dimension not substantially greater than one-quarter of the wavelength of the highest of the test frequencies, said antenna being of directional type and positioned within said cylinder so as to be predominantly receptive to signals propagated along the longitudinal axis of said cylinder, and a signal-transmitting antenna adapted to be connected to signal-generating means and disposed within said cylinder so as to transmit signals to said receiver antenna, the distance of the receiver antenna from said open end being at least equal to the diameter of said cylinder.

4. Apparatus according to claim 3 in which both ends of said cylinder are open and the distance from the center of the receiving antenna to each of the open ends of said cylinder is at least equal to the diameter of said cylinder.

5. A high-frequency screening enclosure of over-all dimensions suitable for use on a test bench, or the like, in testing a radio receiver having a built-in antenna, comprising a supporting base having an electrically conductive top area, a member of wire screening material formed approximately in the shape of a cylinder whose axial length is considerably greater than its largest transverse dimension, the transverse dimensions of said cylinder being such that when said radio receiver is enclosed in said cylinder, the spacing between said antenna and the nearest surface of said cylinder is at least equal to the diameter of said antenna, wire screening electrically closing one end of said cylinder, the other end being open, the lower side of said cylinder being open whereby the screening material has two longitudinal edges, metal rails electrically and mechanically attached to said screening material along said edges, and means for securing said rails in substantially continuous electrical connection to the conductive top of said base within said area.

6. A screening enclosure according to claim 5 in which at least one of said rails is detachable from said conductive top, and means for electrically and mechanically attaching the detachable rail to said conductive top.

7. An enclosure according to claim 6 in which one of said rails comprises an element of a substantially continuously conductive metal hinge.

8. A high-frequency screening enclosure of over-all dimensions suitable for use on a test bench, or the like, in testing a radio receiver having a built-in antenna, comprising a supporting base having an electrically conductive top area, a member of wire screening material formed approximately in the shape of a cylinder of rectangular cross section and whose axial length is considerably greater than its largest transverse dimension, the spacing between said antenna and the nearest surface of said cylinder being at least equal to the largest dimension of said antenna, wire screening electrically closing one end of said cylinder, the other end being open, the lower side of said cylinder being open whereby said screening material has two longitudinal edges, a metal rail electrically and mechanically attached to said screening material along one of said edges, a substantially continuous metallic hinge electrically and mechanically attached to said top area and to the other of said edges, respectively, and clamp means for removably securing said rail in electrical connection to said conductive top of said base within said area.

9. In combination, a supporting base having an electrically conductive top area, a radio receiver having a built-in coil antenna supported by said base above said area, and apparatus for testing said receiver including a high-frequency screening member proportioned to enclose substantially only said receiver and said antenna, said member comprising conductive screening material formed approximately in the shape of a cylinder whose axial length is considerably greater than its largest transverse dimension, the spacing between said antenna and the nearest surface of said cylinder being at least equal to the largest diameter of said antenna, conductive screening material electrically closing one end of said cylinder, the other end being electrically open, the lower side of said cylinder being open whereby the screening material has two longitudinal edges, metal rails electrically and mechanically attached to said screening material along said edges, and means for securing said rails in substantially continuous electrical connection to the conductive area of said top.

10. In combination, a supporting base having an electrically conductive top area, a radio receiver having a built-in inductive coil antenna supported above said area, and apparatus for testing said receiver including a high-frequency screening structure of approximately cylindrical form and having a minimum transverse dimension such that the spacing between said antenna and the nearest wall of said cylinder equals at least the largest dimension of said antenna in a plane at right angles to the axis of the cylinder, said cylinder having at least one electrically open end, the lower side of said cylinder being open whereby said cylinder has two longitudinal edges, and means for securing said longitudinal edges in substantially continuous electrical connection to the conductive area of said top, said antenna member being of directional type and positioned within said cylinder so as to be predominantly receptive to signals propagated along the longitudinal axis of said cylinder, the distance of the receiver antenna from said open end being at least equal to the diameter of said cylinder, and a signal-radiating antenna adapted to be connected to signal-generating means and disposed within said cylinder so as to transmit signals to said receiver antenna, said structure being proportioned to enclose substantially only said receiver with its antenna and said radiating antenna.

11. In apparatus adapted for use in testing a high-frequency radio receiver or the like having a signal pickup element attached thereto, means for screening interfering radiations from said element while permitting reception thereby of test signals introduced within said means, which includes a cylindrical structure of electrically conductive material of overall dimensions suitable for use on a test bench or the like, and having at least one open end and being proportioned to enclose said receiver within said cylinder, an antenna disposed within said cylinder and adapted to transmit test signals therein, the transverse dimensions of said cylinder being such that the walls of said cylinder are spaced from said pick-up element by a distance between one and of the order of two times the largest dimension of said element, and the ratio of the average cross-sectional dimension to axial length of said structure being such that interfering radiations are attenuated substantially as much along the axis of said enclosure as in passing through the side walls thereof as measured at said pickup element.

12. In apparatus adapted for use in testing a high-frequency radio receiver or the like having a signal pick-up element attached thereto, means for introducing test signals into said pickup element, and means for screening interfering radiations from said element while permitting reception thereby of said test signals, which includes a cylindrical structure of electrically conductive material of overall dimensions suitable for use on a test bench or the like, having at least one open end and being proportioned to enclose said receiver within said cylinder, the transverse dimensions of said cylinder being such that the walls of said cylinder are spaced from said pick-up element by a distance between one and of the order of two times the largest dimension of said element, and the ratio of the average cross-sectional dimension to axial length of said structure being such that interfering radiations are attenuated substantially as much along the axis of said enclosure as in passing through the side walls thereof as measured at said pickup element.

13. In apparatus adapted for use in testing a high-frequency radio receiver or the like having a pickup coil element structurally attached thereto, means for screening interfering radiations from said element while permitting reception thereby of test signals introduced within said means, which includes a cylindrical structure of electrically conductive material having at least one open end and being adapted to enclose said receiver at a position along the axis of said cylinder, the transverse dimensions of said cylinder being such that the walls of said cylinder are spaced from said element by a distance between one and of the order of two times the largest dimension of said element, the ratio of the average cross-sectional dimension to length of said structure being such that interfering radiations are attenuated substantially as much along the axis of said enclosure as in passing through the sidewalls thereof as measured at said pickup element, the spacing between the pickup coil element and the nearest open end of the cylinder being equal to at least the smallest transverse dimension of the cylinder, and an inductive coil for transmitting test signals to the pickup coil disposed coaxially with the pickup coil substantially on the longitudinal axis of said cylinder.

14. In apparatus adapted for use in testing a high-frequency radio receiver or the like having a pickup coil structurally attached thereto, means for screening interfering radiations from said coil while permitting reception thereby of test signals introduced within said means, which includes a cylindrical structure of electrically conductive material having at least one open end and being proportioned to enclose said receiver at a position along the axis of said cylinder, the transverse dimensions of said cylinder being such that the walls of said cylinder are spaced from said coil by a distance of between one and of the order of two times the largest dimension of said coil, and the ratio of the average cross-sectional dimension to axial length of said structure being such that interfering radiations are attenuated substantially as much along the axis of said enclosure as in passing through the sidewalls thereof as measured at said pickup coil, the spacing between the pickup coil and the nearest open end of the cylinder being equal to at least twice the smallest transverse dimension of the cylinder, and an inductive coil for transmitting test signals to the pickup coil, said coils being coplanar and disposed substantially on the longitudinal axis of said cylinder.

References Cited in the file of this patent

UNITED STATES PATENTS

| | | |
|---|---|---|
| 739,271 | Green | Sept. 15, 1903 |
| 1,940,769 | Potter | Dec. 26, 1933 |
| 2,202,141 | Carlson | May 28, 1940 |
| 2,446,195 | Shive | Aug. 3, 1948 |
| 2,519,407 | Shive | Aug. 22, 1950 |
| 2,525,554 | Latimer | Oct. 10, 1950 |
| 2,594,971 | Moullin | Apr. 29, 1952 |
| 2,684,462 | Tyzzer | July 20, 1954 |
| 2,704,301 | Feketics | Mar. 15, 1955 |
| 2,753,390 | Feketics | July 3, 1956 |
| 2,760,151 | Andrews | Aug. 21, 1956 |

OTHER REFERENCES

"Production Line, etc.," Tele-Tech & Electronic Ind., pages 76–78 and 160, April 1956.

"Portable Screen Room," Service, page 79, March 1954.

"Ace Shielded Inc.," Ace Engineering & Machine Co. Received in Patent Office March 1955.

UNITED STATES PATENT OFFICE
CERTIFICATE OF CORRECTION

Patent No. 2,913,577

November 17, 1959

John Kelly Johnson

It is hereby certified that error appears in the printed specification of the above numbered patent requiring correction and that the said Letters Patent should read as corrected below.

Column 4, line 63, strike out "cylinder"; line 75, for "Ocassionally" read -- Occasionally --; column 7, line 17, after "where" insert -- small --; line 44, after "open" insert -- end --.

Signed and sealed this 24th day of May 1960.

(SEAL)
Attest:

KARL H. AXLINE
Attesting Officer

ROBERT C. WATSON
Commissioner of Patents